July 11, 1933.  P. C. SEEL  1,917,397
PROTECTING THE SOUND TRACK ON SOUND MOTION PICTURE FILMS
Filed Oct. 28, 1930
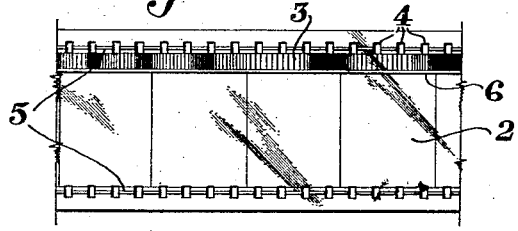
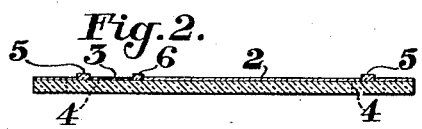
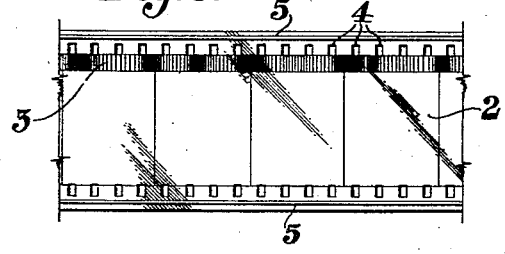
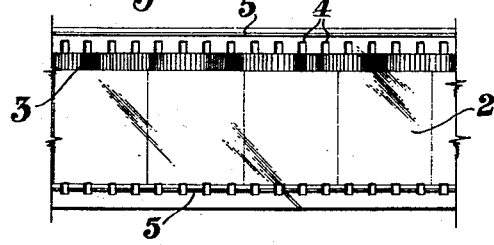
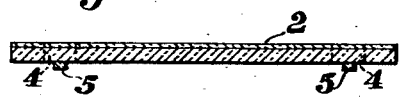
Inventor,
Paul C. Seel,
By
Attorney Patented July 11, 1933

1,917,397

UNITED STATES PATENT OFFICE

PAUL C. SEEL, OF ROCHESTER, NEW YORK, ASSIGNOR TO EASTMAN KODAK COMPANY, OF ROCHESTER, NEW YORK, A CORPORATION OF NEW YORK

PROTECTING THE SOUND TRACK ON SOUND MOTION PICTURE FILMS

Application filed October 28, 1930. Serial No. 491,714.

This invention relates to motion picture film and particularly to motion picture film having a photographic sound record beside the picture area. It relates more specifically to motion picture positives having the picture areas and sound tracks adjacent to each other.

In projecting motion pictures with the sound record printed on the film beside the picture area the film rapidly accumulates objectionable abrasion marks and scratches. Some of this abrasion occurs in the projecting machine, as for instance at the gate from the pressure plates or shoes, and some of it occurs from the film continually rubbing against itself in the convolutions of the rolls in the feed and take-up spools. The scratches and abrasions which occur in the picture area are of relatively little importance as they are not noticed unless very large or very numerous. Abrasion marks of any kind in the sound track, however, are very annoying as they give rise to a considerable amount of objectionable sound usually known as "ground noise." Sound films become useless relatively soon because of the increase of this ground noise to the point where the sound quality is practically ruined. As stated, abrasion on sound films therefore becomes a factor of great importance, as the films do not have as long life as they did when the sound track was not present. It is the general object of my invention to protect such sound films from abrasion marks and scratches gradually accumulated from the causes mentioned and to increase their wear.

In the drawing, the invention is illustrated as follows:

Figure 1 is a top view of a sound and motion picture film showing the ridges along the line of perforations.

Figure 2 is a cross section through the film of Figure 1.

Figure 3 and Figure 4 are plan views showing the ridges in different positions.

Figure 5 is a cross section showing the ridges on the support side.

My invention is carried out by coating thin, narrow ridges of a rapidly drying lacquer along the film, as for instance along the line of perforations. A preferred method is to coat such a thin ridge 5 along each line of perforations 4, one of which is at the side of the sound track 3 and a similar ridge 6 on the other side of the sound track next to the picture area 2, both on the emulsion layer 7, as shown in Figure 2. These ridges may, of course, be placed on the support side as shown in Figure 5, or at other points on the film if the location of the sound and picture areas permits it.

The placing of the ridge directly on each side of and close to the sound track is particularly helpful in the protection of the sound track. In films wider than 35 mm. such as are now coming into use, this form is especially helpful inasmuch as this line intermediate of the perforation helps in maintaining the wide film flat and free from buckle.

It has been proposed to protect motion picture film by applying at or near its edge a thickening coating in liquid form, for example, a solution of nitro cellulose. My invention is distinguished from this by being applied particularly to sound and motion picture film and especially in that by making the ridges very much narrower I am able to secure marked advantages. The narrow ridges which I use, not only protect the film and especially the sound track from abrasion but also greatly increase the wearing qualities of the film against wear and tear on continued projection. I have found from actual experiment that the very narrow ridges increase by several fold the number of times a given film can be projected. The reason seems to be that most of the wear on the film comes at the gate from the pressure plate and the very narrow ridges on the film suffer less wear as they seem to serve as runners on which the film rides. If the ridges are placed on the emulsion side, they keep the shoes of the projector from touching the emulsion.

In carrying out the invention, I use a solution of some cellulose derivative, such as a cellulosic lacquer, or I may use any similar material which will dry quickly to leave a hard, solid ridge. A typical formula would include film scrap dissolved in acetone, an amyl acetate, or a mixture of these. When used on the emulsion side, the lacquer might include acetic acid. The width of the ridge applied is of the order of 10/1000ths of an inch and its thickness on drying down is preferably 2 to 3/1000ths of an inch. This ridge of lacquer is put on the film by any suitable machine which will coat a narrow line of liquid. These ridges may be placed along the line of perforations on either the emulsion side or the support side or both or may be placed elsewhere if the location of the sound track and picture area permit it. Usually it will be satisfactory to place these ridges along the line of perforations (5 in Fig. 1) on the emulsion side in the case of ordinary sound motion picture film. By coating the film in this way the sound as well as the picture area of the film is protected from scratching and abrasion, and besides the life of the film is very much increased through the lessened wear on the film support itself. Another important advantage is that the film is less likely to tear during projection, thus obviating the necessity of patching or splicing and thereby breaking the continuity of the sound record.

I consider as included within my invention all variations and equivalents coming within the scope of the appended claims.

What I claim is:

1. A sound and motion picture film band having along its length narrow ridges of width of the order of 0.010 inch.

2. A sound and motion picture film band having along its length narrow ridges of width of the order of 0.01 inch consisting of a coating of a cellulosic lacquer.

3. A sound and motion picture film band having longitudinal series of perforations and narrow ridges consisting of a coating of a rapidly drying lacquer along the lines of the perforations.

4. A sound and motion picture film band having along its length on the emulsion side narrow ridges consisting of a coating of a rapidly drying lacquer.

5. A sound and motion picture positive film band having along its length thickening ridges of less than 0.02 inch in width consisting of a coating of a rapidly drying lacquer.

6. A sound and motion picture positive film band having a longitudinal series of perforations and along the line of perforations and on the emulsion side narrow ridges having a width of the order of 0.01 inch and thickness of the order of 0.002 inch consisting of a coating of a cellulosic lacquer.

7. A film band having longitudinally thereof a photographic sound record and a narrow thickened ridge on each side of and close to said sound record.

8. A film band having longitudinal sound and picture records and a narrow thickened ridge on each side of said sound record.

9. A film band having parallel longitudinal sound and picture records and narrow thickened ridges on each border of the band and also between the records.

Signed at Rochester, New York, this 13th day of October, 1930.

PAUL C. SEEL.